(12) United States Patent
Chen et al.

(10) Patent No.: US 7,746,934 B2
(45) Date of Patent: Jun. 29, 2010

(54) IMAGE STABILIZATION METHOD

(75) Inventors: Hong Chen, Cupertino, CA (US); Ping Wah Wong, Sunnyvale, CA (US)

(73) Assignee: Nethra Imaging Inc., Santa Clara, CA (US)

( * ) Notice: Subject to any disclaimer, the term of this patent is extended or adjusted under 35 U.S.C. 154(b) by 373 days.

(21) Appl. No.: 11/407,450

(22) Filed: Apr. 19, 2006

(65) Prior Publication Data

US 2007/0248166 A1    Oct. 25, 2007

(51) Int. Cl.
*H04N 7/12* (2006.01)
(52) U.S. Cl. ............ 375/240.29; 375/240; 375/240.01; 375/240.16
(58) Field of Classification Search ........ 375/240, 375/240.01, 240.25, 240.29, 240.12, 240.16; 348/208.8, 223.1, 470, 22; 382/261, 233
See application file for complete search history.

(56) References Cited

U.S. PATENT DOCUMENTS

| 5,196,938 | A | * | 3/1993 | Blessinger | .................... 348/22 |
| 5,473,384 | A | * | 12/1995 | Jayant et al. | ................ 348/470 |
| 5,724,446 | A | * | 3/1998 | Liu et al. | ..................... 382/233 |
| 5,970,180 | A | * | 10/1999 | Niihara et al. | .............. 382/261 |
| 6,665,007 | B1 | * | 12/2003 | Usami | ..................... 348/223.1 |
| 6,734,902 | B1 | * | 5/2004 | Kawahara | ................ 348/208.8 |

* cited by examiner

*Primary Examiner*—Allen Wong
(74) *Attorney, Agent, or Firm*—Hahn & Moodley LLP; Vani Moodley, Esq.

(57) ABSTRACT

In one embodiment, a method for reducing motion artifacts in an output image is provided. The method comprises capturing multiple frames of a scene; determining local motion vectors between each pixel in a current frame and a corresponding pixel in the a previous frame; and performing a temporal filtering operation based on the local motion vectors wherein pixels from a plurality frames are integrated to form the output image.

17 Claims, 5 Drawing Sheets

Block diagram of a still image stabilization system 10. Local motion detection is based on current input frame and previous input frame.

Figure 1. Real time digital imaging / video system that performs capture, processing, display and storage of multiple frames.

Figure 2. Block diagram of a still image stabilization system 10. Local motion detection is based on current input frame and previous input frame.

Figure 4. Block diagram of a still image stabilization system 40. Local motion detection is based on current input frame and previous output frame.

IMAGE STABILIZATION METHOD

FIELD

Embodiments of the invention relate to a method for stabilizing a captured image.

BACKGROUND

A common problem of real time image capturing systems (hereinafter referred to as "imaging systems") is that images captured by such systems may contain motion artifacts due to movement of the image capturing device, or by movement of objects in a scene that is being captured. Both types of movements generally result in blurring of captured images. In order to produce high quality crisp still images, motion artifacts must be minimized.

Consider an imaging system as shown in FIG. 1 that supports both real time video and still image capture, i.e., a system that can process and send out either a single frame or multiple frames of images in real time. In such a system, image processing algorithms can be designed to process either a single frame or multiple frames. An advantage of such a system over a still image processing system is that image processing algorithms can take advantage of the correlation in adjacent frames so that better output quality can be produced.

U.S. Pat. No. 5,629,988 describes a method in video stabilization. Specifically, the method estimates a global motion vector between a captured image and a reference image, determines a transformation parameter based on the global motion vector, and applies the transformation to the captured image. U.S. Pat. No. 6,654,049 suggests using color values as a means to determine motion vector. U.S. Pat. No. 6,809,758 improves on the accuracy of global motion vector determination using a global motion vector histogram that is constructed from information in multiple frames. Since multiple frames are considered, the motion vector from frame to frame can follow a smooth trajectory and the result is improved.

The above methods rely on a global motion vector to correct for an image frame and would work well in video capture by reducing camera shake artifacts. However, these methods do not reduce motion artifacts due to object motion in a scene as object motion in a scene typically affects only a portion of the scene, and hence applying a global motion vector to the entire frame is generally not effective in such case.

SUMMARY

In one embodiment, the invention provides a method for reducing motion artifacts in an output image. The method comprises capturing multiple frames of a scene; determining local motion vectors between each pixel in a current frame and a corresponding pixel in a previous frame; and performing a temporal filtering operation based on the local motion vectors wherein pixels from the multiple frames are integrated to form the output image.

Other aspects of the invention will be apparent from the detailed description below.

BRIEF DESCRIPTION OF THE DRAWINGS

Embodiments of the invention will now be described, by way of example, with reference to the accompanying diagrammatic drawings, in which.

DETAILED DESCRIPTION

In the following description, for purposes of explanation, numerous specific details are set forth in order to provide a thorough understanding of the invention. It will be apparent, however, to one skilled in the art, that the invention may be practiced without these specific details. In other instances, structures and devices are shown at block diagram form only in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Broadly, embodiments of the present invention disclose a still image capturing method that minimizes motion artifacts caused by camera motion and by object motion in a scene. The method uses multiple frames captured by a real time imaging system, wherein the exposure time of each frame is set to a short duration to avoid blurring within each frame. Since a short exposure time is used, each individual frame can be noisy. The method constructs a final still image using multiple frames so that the effective exposure of the constructed image is substantially longer than that of each frame. The construction step determines local motion vectors at every pixel location, and then uses a filter to perform integration while taking the local motion vectors into account. As a result, the method can minimize motion artifacts caused by either camera motion or object motion in the scene.

Embodiments of the present invention also cover an image processor which includes logic to perform the image capturing method. An imaging system which includes such an image processor is also covered.

Figure 1:
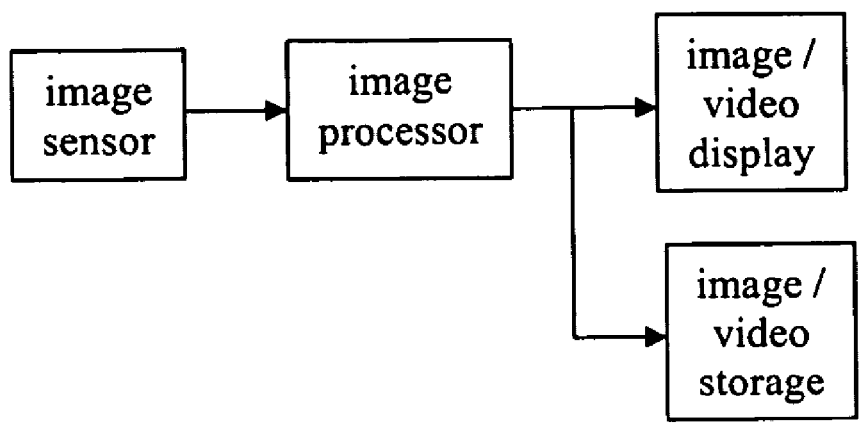
FIG. 1 illustrates a real-time imaging system.
Figure 2:
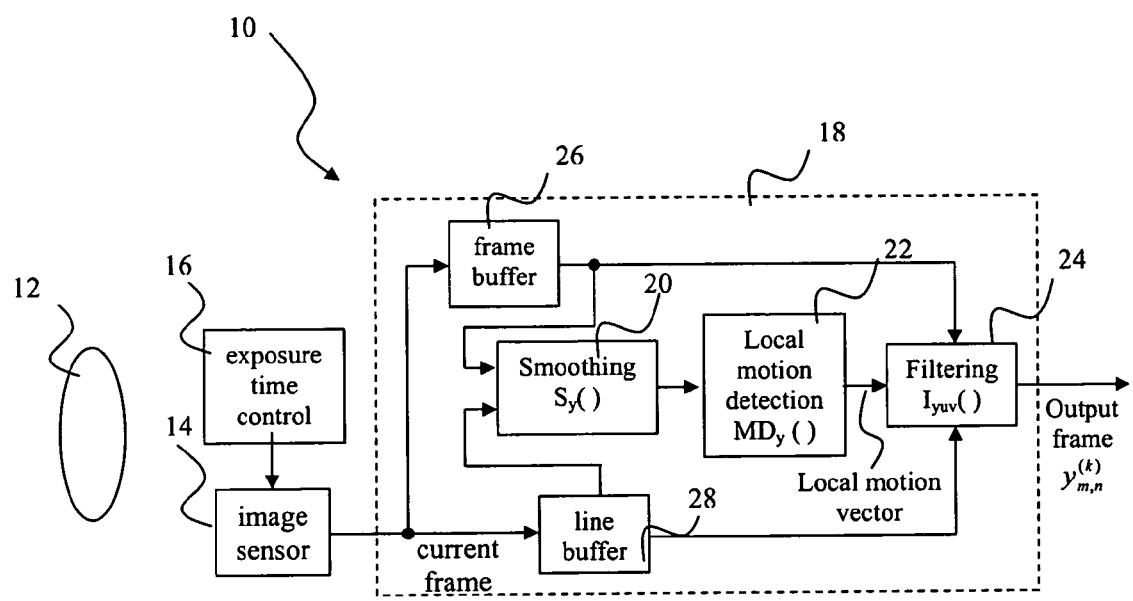
FIGS. 2 and 4 show a high-level block diagram of an imaging system, in accordance with embodiments of the invention.

Turning now to FIG. 2 of the drawings, there is shown a high-level block diagram of an imaging or camera system in the form of a still image stabilization system 10. The system 10 includes camera optics 12 coupled to an image sensor 14. Operation of the image sensor 14 is controlled by an exposure time control circuit 16. The image sensor 14 is coupled to an image processor 18. The image processor 18 includes a smoothing block 20, a local motion detection block 22, a filtering block 24, a frame buffer 26 for data from previous frames, and a line buffer 28 for a current frame. The system 10 captures multiple frames and uses them to construct an output frame.

Figure 3:
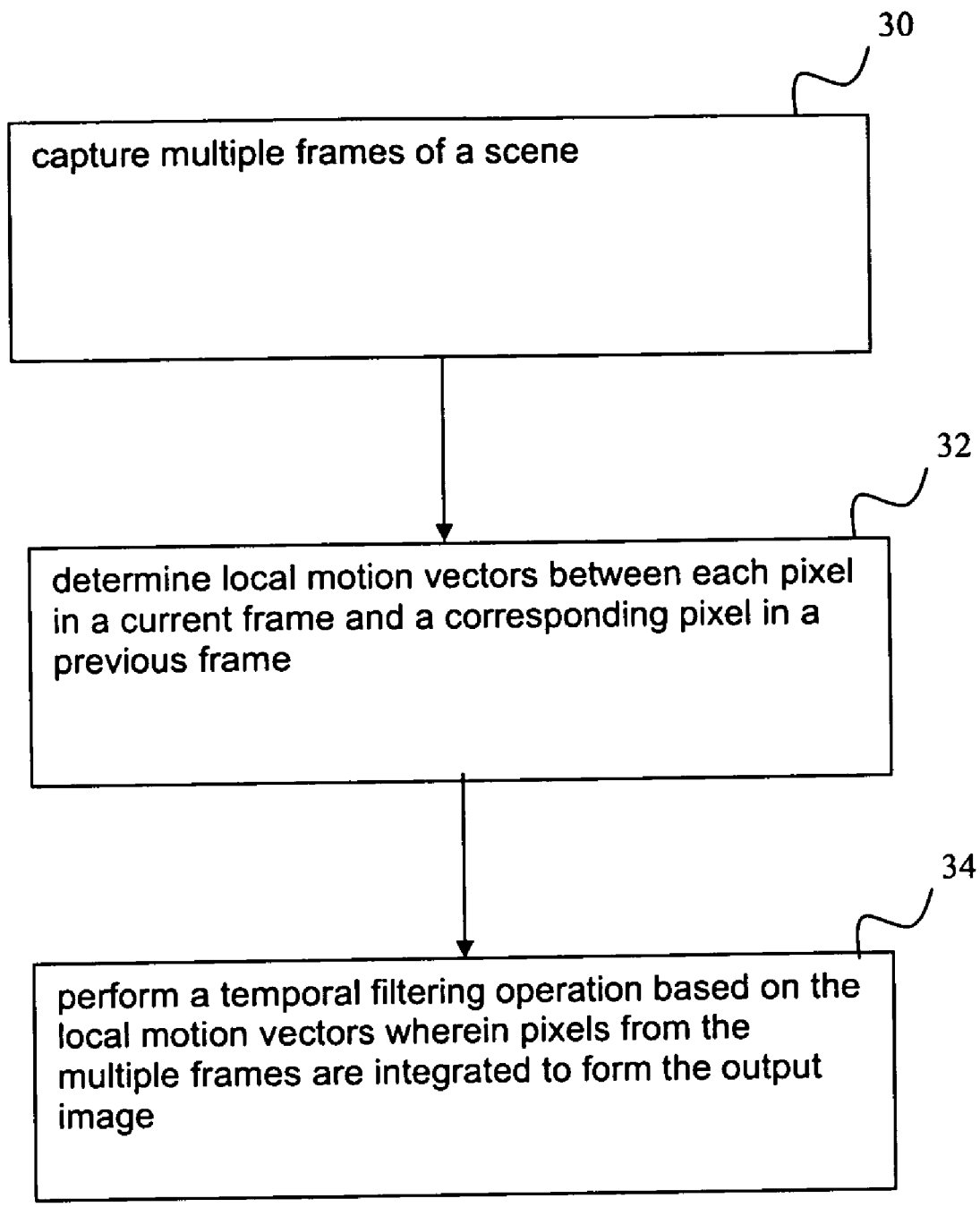
FIG. 3 shows a flowchart for a method to stabilize an image, in accordance with one embodiment of the invention.

The image processor 18 performs a method for reducing motion artifacts in an output image. The method is illustrated by the flowchart of FIG. 3. Referring to FIG. 3 it will be seen that at block 30 multiple (input) frames of a scene are captured. At block 32 local motion vectors between each pixel in a current frame and a corresponding pixel in a previous frame are determined. Finally, at block 34 a temporal filtering operation based on the local motion vectors is performed. The temporal filtering operation includes integrating pixels from the multiple frames to form the output image.

In one embodiment, to minimize motion artifact in each input frame, an exposure time for each input frame is set to a short duration.

Because a relatively short exposure time is used for each input frame, each input frame is relatively noisy. Typical sources of noise can include image sensor noise, processing errors, compression distortions, environment perturbations, etc. Generally the lower the exposure time, the lower the number of photons that reach the sensor, and hence the captured image is noisier.

In one embodiment the temporal filtering operation includes applying a temporal low pass filter to remove noise in the images. Specifically, the output pixel at each location (m, n) is obtained by averaging pixels of successful frames at the same location (m, n). In other words, the output image $y_{m,n}^{(k)}$ at time k can be written as $$y_{m,n}^{(k)} = \sum_{i=0}^{N-1} h_i x_{m,n}^{(i)} \quad (1)$$

where $x_{m,n}^{(i)}$ is pixel at the (m, n) location of the $i^{th}$ frame, and $h_i$ is a sequence of weights satisfying $$\sum_{i=0}^{N-1} h_i = 1. \quad (2)$$

A temporal low pass filtering algorithm is superior compared to spatial low pass filtering within each frame because temporal filtering can avoid blurring of images caused by spatial averaging. One of ordinary skill in the art will appreciate that the application of temporal filtering effectively increases the equivalent exposure time of the output image.

Figure 4:
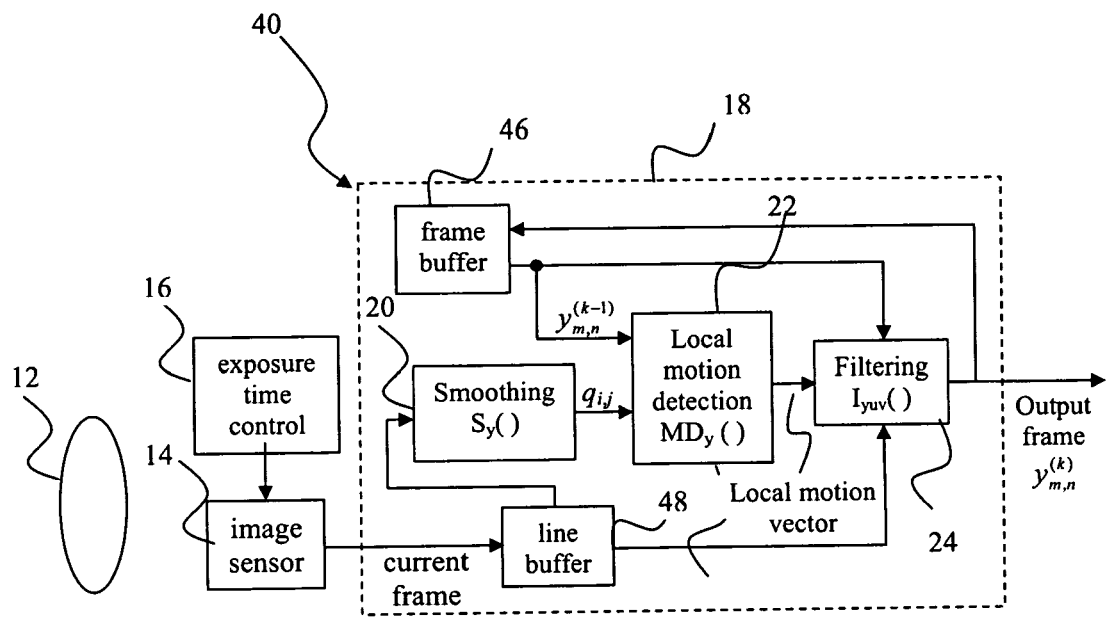

The filter in (1) is known as a finite impulse response (FIR) filter in digital signal processing. It is also possible to perform temporal filtering using an infinite impulse response (IIR) filter given by $$y_{m,n}^{(k)} = \alpha y_{m,n}^{(k-1)} + (1-\alpha) x_{m,n}^{(k)} \quad (3)$$

where $\alpha$ is a constant between 0 and 1. An advantage of (3) compared to (1) is that only one previous output frame will need to be stored in the case of (3), where as buffering of N−1 previous input frames is necessary in (1). To implement (3), an embodiment as shown in FIG. 4 may be used, as will be described later Although motion artifacts within each frame are minimized, motion of either the camera or the object in a scene can result in substantial differences from frame to frame. This means both (1) and (3) will cause the output image to be blurred because pixels representing different regions of the image or different objects in the image are blended together. As a result, in one embodiment, a local motion detection step is performed by the block 22 in FIG. 2.

Figure 5:
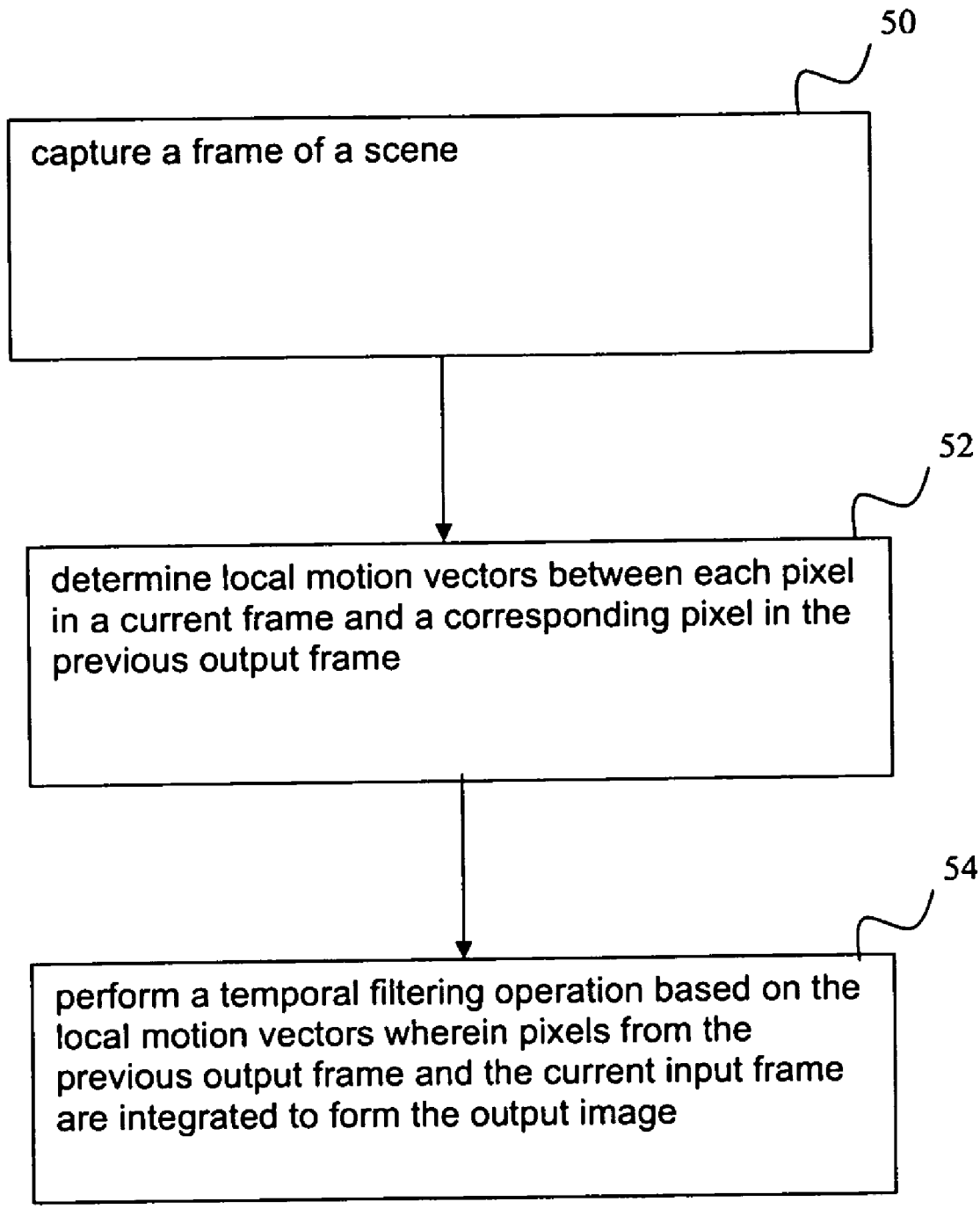
FIG. 5 shows a flowchart of an image stabilization technique performed by the embodiment of FIG. 4.

In one embodiment, local motion detection is performed by comparing the current input frame with a stored previous input frame. For the embodiment shown in FIG. 2 of the drawings motion detection is performed using the current input frame and a previous input frame. FIG. 4 of the drawings shows another embodiment of an imaging system 40 in which motion detection is performed using the current input frame and a previous output frame from the temporal filter given by (3). The imaging system 40 is very similar to the imaging system 10; except the former stores only one previous output frame in its frame buffer whereas the latter stores multiple previous input frames. Accordingly the same reference numerals are used to indicate like components between the two systems. The imaging system 40 includes a frame buffer 46 and a line buffer 48. The frame buffer 46 has a capacity of one frame of image data, and the line buffer 48 has a capacity to store a small number of lines (e.g., less than 8) of image data. FIG. 5 of the drawings shows a flowchart of an image stabilization technique performed by the imaging system 40. Referring to FIG. 5, it will be seen that at block 50, an input image frame is captured. At block 52, local motion vectors between each pixel in the current input frame and the previous output frame are determined. Finally, at block 54, a temporal filtering operation based on the local motion vectors is performed. The temporal filtering operation included integrating pixels from the previous output frame and the current input frame to form the output image.

In the systems 10 and 40, motion detection is performed for every pixel location in the current input frame. This information is used in the temporal filtering procedure. An efficient method to perform motion detection is to use the luminance component of the image data, and ignore the chrominance values.

Image data coming from image sensors generally contain noise, and noise can significantly affect the accuracy of motion detection. As a result, in one embodiment, a local smoothing procedure $S_y(\ )$ is applied by the block 20 to the input image data in the current frame before motion detection is performed. The local smoothing procedure $S_y(\ )$ is designed for reducing the noise level in the current input frame so that accurate motion detection can be achieved. The image data used at the input of the filtering block $I_{yuv}(\ )$ is un-smoothed. As a result, the overall temporal filtering method can reduce noise using image data from multiple frames and at the same time prevent blurring in the output images.

It is noted that many parameters including the algorithm steps, the block size parameters, the criterion in determining acceptance of local motion vectors, and the integration method will impact on the quality of the output image. The specific procedure of each step and the selection of parameters are described in the following sections.

Exposure Time

Generally a short exposure time is preferred so that each captured frame contain crisp image data with little motion artifact. As described earlier, short exposure time also means that each individual frame is noisy, and hence there is a need to incorporate the motion compensated temporal filtering. In one embodiment, it has been found that exposure time in the range of ¹⁄₂₅₀ to ¹⁄₂₀₀₀ seconds is appropriate.

Smoothing $S_x(\ )$

As described earlier, luminous values between image pixels in consecutive frames are processed to produce the local motion vectors at every pixel location. In order to accurately determine the motion vectors, noise in the input data is removed, in one embodiment, before the comparisons are done. The smoothing block $S_x(\ )$ applies spatial low pass filtering to reduce noise in the current input frame before the pixel data are used in the motion detection block. Referring to FIG. 3, the smoothed value for a pixel can be calculated from a window around the pixel as $$q_{i,j} = \sum_{m=-M}^{M} \sum_{n=-N}^{N} w_{m,n} x_{i-m, j-n} \quad (4)$$

where M and N define the support size of the smoothing filter, $w_{i,j}$ is the weight or point spread function of the smoothing filter, $x_{i,j}$ is the luminous value of the current frame, and $q_{i,j}$ is the output of the smooth block. The point spread function is often normalized so that $$\sum_{m=-M}^{M}\sum_{n=-N}^{N} w_{m,n} = 1. \qquad (5)$$

In one embodiment, the values M and N are both set to 1, and the weights are uniform with values equal to ⅑ for each coefficient.

Motion Detection

The motion detection block $MD_y(\ )$ calculates the local motion vector for each pixel in the current frame. For an efficient implementation, it is sufficient to compare the luminance values between two frames. Consider a block of pixels $q_{i,j}$ of size 2K+1 by 2L+1 centered at pixel location (m, n) in the current smoothed frame. The variable $q_{i,j}$ represents the filtered or smoothed result of the luminance values in the current input frame. In one embodiment, the sum absolute difference $D_{m,n,r,s}$ between this block and a block of luminance values centered at (m+r, n+s) in the previous frame is calculated as follows:

$$D_{m,n,r,s} = \sum_{k=-K}^{K}\sum_{l=-L}^{L} |p_{m+k+r,n+l+s} - q_{m+k,n+l}| \qquad (6)$$

where the parameters r and s are restricted to a search range. The best local motion vector at location (m, n) of the current input frame is defined as $$(r^*, s^*)_{m,n} = \underset{r,s}{\mathrm{argmin}} D_{m,n,r,s} \qquad (7)$$

In other words, determination of the motion vector at the pixel location (m, n) in the current input block is to find a block in the previous frame that has the closest match to the block around the location (m, n) in the current input block. Generally, the complexity of the algorithm increases with the size of the search range. In a one embodiment, a search range of 31×31 is selected, and K=L=1.

In order to find an optimally matched location in the previous output frame for a pixel at location (m, n) in the current input frame, in one embodiment a block of pixels centered at (m, n) is considered and $(r^*, s^*)_{m,n}$ according to Equation (7) is found. In this case, $(r^*, s^*)_{m,n}$ is the center pixel of a block in the previous output frame that is the closest match to the block centered at (m, n) in the current input frame. For the purpose of temporal filtering, in one embodiment the pixel at location $(r^*, s^*)_{m,n}$ in the previous output block is considered to be the best match of the pixel at location (m, n) in the current input frame.

Block Noise Threshold and Block Rejection Threshold

Even with two frames with relatively low noise, motion vector determination can sometimes be incorrect. For example, the captured noise over a relatively clean background such as a wall can lead to non-zero motion vectors even though the area is not moving. Based on this observation, embodiments of the present invention use a parameter β called block noise threshold. When the difference between the pixel values in a block of the current frame and the block in the same location of previous output frame is below the block noise threshold, i.e., when $D_{m,n,0,0} \leq \beta$, then the local motion vector at (m, n) is considered to be zero.

Another consideration in motion detection is that there may not be a matched block within the defined search area to the block in the input image, although the minimization criterion in (6) will always return a motion vector. As a result, in one embodiment of the present invention a parameter γ called block rejection threshold is used. When the difference between the pixel values in a block of the current frame and any block in the previous output frame within the search range is above the block rejection threshold, i.e., when $D_{m,n,r,s} \geq \gamma$ for all (r, s) within the search range, then the local motion vector at (m, n) is rejected. That is, the "optimum" match (r*, s*) is not used in the filtering procedure.

It turns out that the block noise threshold and block rejection threshold are related. For image sets at a similar quality or noise level, the parameters β and γ are linearly related to each other. In other words, when the block rejection threshold γ increases, so does the block noise threshold β. A reason is that both of them depend on image noise. When the level of noise in the images is increased, both the block noise threshold and block rejection threshold increase. In one embodiment, a single quantity called MaxDiffPerPixel is used, which is independent of block size because the parameter is normalized to a per pixel basis. The block rejection threshold γ is set to MaxDiffPerPixel times the block size. That is γ=(2K+1)*(2L+1)*MaxDiffPerPixel.

At the same time, the block noise threshold β is set to β=γ/6. In one embodiment the value MaxDiffPerPixel may be set as a linear function of the sensor gain, and the proportional factor can be determined by calibration.

Temporal Filtering

The final step in the method is to perform temporal filtering based on the results of the motion vector determination and thresholding steps. The procedure can be summarized as $$y_{m,n} = \begin{cases} x_{m,n} & \text{if } \min_{(r,s) \in S} D_{m,n,r,s} \geq \gamma \\ \alpha_0 y_{m,n} + (1-\alpha_0) x_{m,n} & \text{if } \max_{(r,s) \in S} D_{m,n,r,s} \leq \beta; \ \beta < \gamma \\ \alpha_1 y_{m+r^*, n+s^*} + (1-\alpha_1) x_{m,n} & \text{otherwise.} \end{cases} \qquad (8)$$

where $\alpha_0$ and $\alpha_1$ are the filtering parameters where the motion vector at the location (m, n) was considered to have zero and non-zero values, respectively.

In other words, if $D_{m,n,r,s}$ for all (r, s) within the search range exceeds the block rejection threshold, the motion vector is rejected and no filtering is performed. On the other hand, if $D_{m,n,r,s}$ for all (r, s) within the search range is lower than the block noise threshold, the local motion vector is considered to be zero, and filtering of the form (3) is performed. Otherwise, the local motion vector is accepted and the motion compensated pixel in the previous output frame is used in the filtering procedure.

In one embodiment where only two frames with similar noise levels are considered, α is selected to be 0.5, i.e. equal weights are given to each of the two frames. However, because the techniques described herein may be used recursively and consecutively on a sequence of frames, the noise level in the "previous output frame" will gradually decrease because of the accumulative effect of the filtering procedure. Thus in one embodiment α is selected to be greater than 0.5, i.e., higher weight is given to the previous output frame which has a lower noise level. In one embodiment a is selected to be less than 1 to prevent the image sequence becoming stagnant, i.e. the output frames are not changing although the input frames are.

As an example, consider the case where the techniques described herein are applied to ten consecutive input frames. Assuming that the initial condition is zero, and applying (8) recursively 9 times for the case that the motion vector was considered to have zero value, the $(m, n)^{th}$ pixel for the $10^{th}$ output frame will be $$y_{m,n}^{(10)} = (1-\alpha_0)x_{m,n}^{(10)} + \alpha_0(1-\alpha_0)x_{m,n}^{(9)} + \alpha_0^2(1-\alpha_0)x_{m,n}^{(8)} + \ldots + \alpha_0^9(1-\alpha_0)x_{m,n}^{(1)}. \quad (9)$$

For example, if $\alpha_0 = 0.75$, then (9) becomes $$y_{m,n}^{(10)} = 0.25 x_{m,n}^{(10)} + 0.1875 x_{m,n}^{(9)} + \ldots + 0.01877 x_{m,n}^{(1)}$$

One of ordinary skill in the art will appreciate that, the procedure is equivalent to a weighted average of the pixels in the past input frames. For the case where the motion vectors are accepted and using a small value such as $\alpha_1 = 0.1$, applying (8) recursively will give the result $$y_{m,n}^{(10)} \approx 0.9 x_{m,n}^{(10)} + 0.09 x_{m,n}^{(9)} + 0.009 x_{m,n}^{(8)}.$$

In this case, the most recent frame dominates the result, as it should.

For the above case, the values $\alpha_0$ and $\alpha_1$ are chosen so that a relatively large value of $\alpha_0$ enables multi-frame averaging to reduce noise in the case where there is little motion. When there is motion, light condition on a particular object in the scene may be different in consecutive frames and it may affect the precision of the motion detection. As a result, a relatively small value of $\alpha_1$ is used so that blurring of the local neighborhood is minimized.

What is claimed is:

1. A method for reducing motion artifacts in an output image, comprising:
    capturing multiple frames of a scene;
    determining local motion vectors between each pixel in a current frame and a corresponding pixel in a previous frame; and
    performing a selective temporal filtering operation based on the local motion vectors to form the output image; wherein said temporal filtering operation (a) rejects a local motion vector if the local motion vector is above a threshold in which case no temporal filtering is performed; (b) averages a current pixel with the corresponding pixel from the previous frame if the local motion vector for the current pixel is considered zero; and (c) averages the current pixel with the motion-compensated pixel from the previous frame in all other cases.

2. The method of claim 1, wherein an effective exposure time for the output image is longer than for each of the multiple frames.

3. The method of claim 1, wherein determining the local motion vectors comprises for each pixel location (m,n) in the current frame, defining a block of pixels centered at (m,n) in the current frame and finding a block in the previous frame that is the closest match to the block of pixels centered at (m,n) in the current frame.

4. The method of claim 3, further comprising applying a smoothing filter to the current and previous frames prior to calculating the local motion vectors.

5. The method of claim 3, wherein the smoothing filter comprises a spatial low pass filter.

6. The method of claim 3, wherein performing the temporal filtering operation comprises selectively adjusting for pixel motion between a current and a previous frame.

7. The method of claim 6, wherein selectively adjusting for pixel motion comprises rejecting a motion vector if a degree of similarity between the closest matching block in the previous frame to the block of pixels in the current frame centered on (m,n) exceeds a predefined block rejection threshold.

8. The method of claim 6, wherein selectively adjusting for pixel motion comprises applying a motion vector of zero if a degree of similarity between the closest matching block in the previous frame to the block of pixels in the current frame centered on (m,n) is below a predefined block noise threshold.

9. The method of claim 1, wherein in determining the closest match, luminance values for the pixels in each block are compared.

10. The method of claim 1, wherein the temporal filtering operation comprises applying a finite impulse response filter.

11. The method of claim 1, wherein the temporal filtering operation comprises applying an infinite impulse response filter.

12. An image processor, comprising:
    an image buffer to store image data for a captured image; and
    image stabilization logic to reduce motion artifacts in an output image, wherein the image stabilization logic captures multiple frames of a scene; determines local motion vectors between each pixel in a current frame and a corresponding pixel in a previous frame; and performs a selective temporal filtering operation based on the local motion vectors to form the output image; wherein said temporal filtering operation (a) rejects a local motion vector if the is above a threshold in which case no temporal filtering is performed: (b) averages a current pixel with the corresponding pixel from the previous frame if the local motion vector for the current pixel is considered zero; and (c) averages the current pixel with its motion-compensated pixel from the previous frame in all other cases.

13. The image processor of claim 12, wherein determining the local motion vectors comprises for each pixel location (m,n) in the current frame, defining a block of pixels centered at (m,n) in the current frame and finding a block in the previous frame that is the closest match to the block of pixels centered at (m,n) in the current frame.

14. The image processor of claim 12, wherein the temporal filtering comprises applying either a finite impulse response filter or an infinite impulse response filter.

15. A camera system, comprising:
    camera optics;
    an image sensor positioned so that light passing through the camera optics impinges on the image sensor; and
    an image processor coupled to the image sensor to receive image data for a captured image therefrom, wherein the image processor comprises image stabilization logic to perform a method for reducing motion artifacts in an output image, comprising:
        capturing multiple frames of a scene;
        determining local motion vectors between each pixel in a current frame and a corresponding pixel in the a previous frame; and
        performing a temporal filtering operation based on the local motion vectors to form the output image; wherein said temporal filtering operation (a) rejects a local motion vector if the local motion vector is above a threshold in which case no temporal filtering is performed: (b) averages a current pixel with the corresponding pixel from the previous frame if the local motion vector for the current pixel is considered zero; and (c) averages the current pixel with the motion-compensated pixel from the previous frame in all other cases.

16. The camera system of claim 15, wherein determining the local motion vectors comprises for each pixel location (m,n) in the current frame, defining a block of pixels centered at (m,n) in the current frame and finding a block in the previous frame that is the closest match to the block of pixels centered at (m,n) in the current frame.

17. The camera system of claim 15, wherein the temporal filtering operation comprises either a finite impulse response filter or an infinite impulse response filter.

* * * * *